Patented Aug. 15, 1939

2,169,991

UNITED STATES PATENT OFFICE 2,169,991

RESINOUS CONDENSATION PRODUCTS AND METHOD OF PREPARING SAME

Israel Rosenblum, Jackson Heights, N. Y.

No Drawing. Application November 3, 1934, Serial No. 751,420

6 Claims. (Cl. 260—25)

The present invention relates to the production of synthetic resins containing a phenol-aldehyde resin, and has for its general object to produce a resin having incorporated therein by chemical reaction a phenol-aldehyde condensate, such resin being soluble in varnish oils and being characterized by such a low acid number as to be considered practically neutral.

There are numerous references in the patent and other literature to the effect that the resinous condensation products of phenols and aldehydes, and particularly of ordinary phenol and formaldehyde, are basic in reaction or that if they are amphoteric they are sufficiently basic to combine with natural resins such as rosin so as to be neutralized by the latter.

Researches conducted by me over a period of many years have, however, shown that phenol-formaldehyde resins are definitely acidic in character. This is particularly true as the condensation proceeds to the resinous condition, and in such condition the condensate is decidedly more acidic than basic, if it is basic at all, and can not be neutralized with rosin or other acidic material.

Attempts to neutralize phenol-formaldehyde condensates by means of an approximately equivalent amount of a polyhydric alcohol, such as glycerol, have however failed to produce a satisfactory material. The mixture of phenol-formaldehyde resin and glycerol, or the mixture of phenol, formaldehyde and glycerol when the latter is added at the start of the reaction, when heated to elevated temperatures yielded rubbery, infusible masses especially when the proportion of formaldehyde was relatively high, say considerably above 1 mol per mol of phenol, as is desirable in practice, and particularly in the presence of a catalyst. Thus a mixture of phenol (carbolic acid), formaldehyde, a catalyst, and a relatively small amount of glycerol is rapidly converted into a gel at about 110° C. when more than 1 mol of formaldehyde is employed per mol of phenol.

I have however found that by the use of a relatively large excess of the polyhydric alcohol, the heating can safely be continued even up to 130° C. until a resinous condensation product is obtained. This condensation product is a clear homogeneous, usually rather viscous liquid in spite of the fact that phenol-formaldehyde condensation products do not dissolve clear in glycerol. The presence of the glycerol thus appears to have modified the character of the resinous condensate and it may be that the phenolic resin has to some extent modified the character of the glycerol. Thus glycerol will not dissolve a commercial phenol-formaldehyde resin, produced by condensation at 100–110° C., even at about 130° C., whereas the same amount of glycerol, provided it is considerably in excess of the theoretical amount required to neutralize the phenolic condensate, if present during the condensation, will be completely compatible with the resin.

As further evidence of the changed character of the glycerol, or of the influence of the resinous reaction product thereupon, it may be mentioned that a phenol-formaldehyde-glycerol condensate, after heating to 130° C. to drive off the water, will dissolve to a clear solution in pine oil or in terpineol although glycerol is not soluble in pine oil nor in terpineol or dipentene, which are two of the major constituents of pine oil.

The excess polyhydric alcohol may be neutralized in any known manner as by means of an acidic natural resin which is preferably added at a relatively low temperature, say about 160° C., after which the esterification is continued at about 250° C. If desired, a quantity of dipentene or of pine oil or terpineol or other terpene alcohol may be added at the beginning of the reaction or at any stage in the reaction, as described in my copending applications Ser. Nos. 538,248 filed May 18, 1931, and 580,495 filed Dec. 11, 1931, of which the present application is a continuation in part. The process is preferably so conducted that free, unreacted high boiling solvents, such as terpineol and dipentene are expelled and a resin which is solid at room temperature is obtained. In this manner I obtain resins which are readily soluble in varnish oils and whose oil varnishes can be thinned with turpentine. The resins are also soluble in mineral spirits and in the other common resin solvents.

In place of ordinary phenol I may use a substituted phenol, preferably one containing a substituting group having four or more carbon atoms, such as butyl, amyl and diphenyl phenol, or I may employ mixtures of ordinary phenol with substituted phenols. In such cases the polyhydric alcohol, particularly glycerol, operates to effect neutralization of at least part of the phenolic condensate and aids in the obtainment of a resin having an extremely low acid number.

Where pine oil or terpineol is added to the reaction mixtures the latter may be heated to higher temperatures or for longer periods of time without danger of gelling.

The invention will be further described with the aid of the following examples which illustrate a number of satisfactory methods of carrying out the invention.

Example 1

| | |
|---|---|
| Phenol | 94 grams (1 mol) |
| 40% formaldehdyde solution | 225 grams (3 mol) |
| Zinc acetate | 2 grams |
| Glycerol | 90 grams | are condensed by refluxing at the boiling point for about fifteen hours, after which the condenser is removed and the material is dehydrated at about 110° C. or at a lower temperature with the use of a vacuum. After the mechanically admixed water (i. e. water of solution of the formaldehyde) and also the water of reaction are removed, the material is gradually heated to about 120° C. or higher, if necessary, until a clear, viscous mass is obtained.

The free alcoholic groups are neutralized by any known acidic natural resin. Thus 780 grams of rosin may be added and the temperature gradually raised to about 250° C. under pressure, releasing the water of reaction being permitted to escape, until a clear, oil-soluble resin is obtained which is solid at room temperature.

*Example 2.*—Like Example 1 with the exception that to the refluxing charge about 50 grams of pine oil are added and the material, after dehydration, is gradually heated to 130° C. or higher until a sample is clear in the cold. The neutralization of the free alcoholic groups is then carried on as in Example 1.

Example 3

| | |
|---|---|
| Para cresol | 108 grams (1 mol) |
| 40% formaldehyde solution | 150 grams (2 mol) |
| Zinc acetate | 2 grams |
| Glycerol | 85 grams | are condensed and dehydrated as in Example 1. After the water is removed the material is gradually heated to 130° or higher, if necessary, until a clear viscous mass is obtained.

The free alcoholic groups are then neutralized with an acidic natural resin as described in Example 1.

Example 4

| | |
|---|---|
| Phenol | 71 grams (¾ mol) |
| Amyl phenol | 41 grams (¼ mol) |
| 40% formaldehyde solution | 225 grams (3 mol) |
| Zinc acetate | 2.5 grams |
| Glycerol | 107 grams | are condensed and dehydrated as previously described. The material is then gradually heated to about 130° or higher, if necessary, to obtain a clear, viscous mass.

The free alcoholic groups are then neutralized by heating to about 250° C. with 930 grams of rosin, until a hard, clear resin is obtained, which is readily soluble in fatty oils.

*Example 5.*—Same as Example 4, except that an equivalent amount of butyl phenol is substituted for the amyl phenol. In each case the use of the para tertiary compound is preferred.

Example 6

| | |
|---|---|
| Amyl phenol | 164 grams (1 mol) |
| 40% formaldehyde solution | 225 grams (3 mol) |
| Zinc acetate | 2.5 grams |
| Glycerol | 94 grams |
| Pine oil | 80 grams | are condensed and dehydrated as previously described. The material is then gradually heated to about 130° or higher, if necessary, to obtain a clear, viscous mass.

The free alcoholic groups are then neutralized in the described manner by heating with 820 grams rosin to about 250° C. under pressure, the water vapor being permitted to escape until a clear, oil-soluble resin is obtained.

While I prefer to conduct the above-described process to the point at which resins solid at room temperature are obtained, I may stop the condensation at an earlier stage, or I may add various oils to the reaction mixture, preferably after the initial phenolic resin has been formed, and thus obtain coating compositions as the final products.

The initial condensation under reflux may be replaced by condensation at about 110° C. at about 10 lbs. pressure, the vapors being permitted to escape at such pressure.

Although neither a phenol-formaldehyde resin nor glycerol is soluble in dipentene, the latter compound may be added along with the rosin or other acidic neutralizing agent, or it may be present during the initial condensation, most of the dipentene being expelled during the heating at elevated temperatures, the part remaining in the resin apparently taking part in the reaction as the final product is clear and homogeneous.

The resins obtained as hereinabove described are practically neutral in character, acid numbers of only about 10 or even below being readily obtainable. If desired, a substantially neutral ester gum may be added to the reacting mixture at any stage of the process.

In place of at least part of the acidic natural resin, any other suitable acid organic material may be employed, such as the acids obtainable on hydrolysis of a fatty oil or of a fat, especially of a drying oil, like linseed, tung, soya bean and other oxidizable oils.

I claim:

1. The method which comprises reacting one mol of a phenolic body, at least about two mols of formaldehyde, and approximately one mol of glycerol until a viscous condensate is obtained, and then neutralizing excess glycerol with an acidic natural resin.

2. The method which comprises reacting approximately 71 grams of phenol, 41 grams of amyl phenol, 225 grams of 40% formaldehyde solution, 2.5 grams of zinc acetate, 107 grams of glycerol, expelling the water and gradually heating the mixture to about 130° C. until a clear viscous mass is obtained, then adding approximately 930 grams of rosin and continuing the heating to about 250° C. until a resinous material is obtained which is solid and clear at room temperature and is compatible with fatty oils.

3. The method which comprises reacting approximately one mol of a phenol substituted in the nucleus by a member consisting of saturated alkyl radicals higher than methyl, and phenyl radicals, with more than one mol and up to approximately three mols of formaldehyde in the presence of approximately one mol of glycerol, expelling the water, then neutralizing the mass with an acidic natural resin.

4. The method which comprises reacting approximately one mol of a phenol substituted in the nucleus by a member consisting of saturated alkyl radicals higher than methyl, and phenyl radicals, with more than one mol and up to approximately three mols of formaldehyde in the presence of approximately one mol of glycerol and a quantity of pine oil, expelling the water, and then neutralizing the mass with an acidic natural resin.

5. An oil-soluble resin produced in accordance with the process of claim 1.

6. The method which comprises reacting approximately one mol of a phenol substituted in the nucleus by a member of the group consisting of saturated alkyl radicals higher than methyl, and phenyl radicals, with more than one mol and up to approximately three mols of formaldehyde in the presence of approximately one mol of glycerol and a quantity of pine oil, expelling the water, and then neutralizing the mass with an acidic natural resin.

ISRAEL ROSENBLUM.